(12) United States Patent
Anand et al.

(10) Patent No.: US 12,353,870 B2
(45) Date of Patent: Jul. 8, 2025

(54) SYSTEM AND METHOD FOR UPGRADING A TECHNOLOGY STACK IN A COMPUTING INFRASTRUCTURE

(71) Applicant: Bank of America Corporation, Charlotte, NC (US)

(72) Inventors: Vasuki Anand, Chennai (IN); Kalyanasundaram Ramanathan, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 188 days.

(21) Appl. No.: 18/348,888

(22) Filed: Jul. 7, 2023

(65) Prior Publication Data

US 2025/0013454 A1 Jan. 9, 2025

(51) Int. Cl.
*G06F 8/65* (2018.01)
*G06F 11/30* (2006.01)

(52) U.S. Cl.
CPC ............ *G06F 8/65* (2013.01); *G06F 11/3003* (2013.01)

(58) Field of Classification Search
None
See application file for complete search history.

(56) References Cited

U.S. PATENT DOCUMENTS

| | | |
|---|---|---|
| 7,873,940 B2 | 1/2011 | Sanghvi et al. |
| 7,895,572 B2 | 2/2011 | Stienhans |
| 9,052,845 B2 | 6/2015 | Brandt |
| 9,098,364 B2 | 8/2015 | Davis |
| 9,354,904 B2 | 5/2016 | Sanghvi et al. |
| 9,513,948 B2 | 12/2016 | Bucknell et al. |
| 9,729,623 B2 | 8/2017 | Huang et al. |
| 9,754,303 B1 | 9/2017 | Jagtap et al. |
| 9,792,141 B1 | 10/2017 | Sethuramalingam et al. |
| 9,858,060 B2 | 1/2018 | Barros et al. |
| 10,284,634 B2 | 5/2019 | Burton et al. |
| 10,310,967 B1 | 6/2019 | Padilla-Ruberte |
| 10,691,514 B2 | 6/2020 | McClory et al. |
| 10,754,822 B1* | 8/2020 | Patil ..................... G06F 16/119 |
| 10,977,167 B2 | 4/2021 | Cheung et al. |
| 10,996,935 B2 | 5/2021 | Jonnadula et al. |
| 11,245,519 B1 | 2/2022 | Stapleton, Jr. et al. |
| 11,556,449 B2 | 1/2023 | Rakshit |
| 2015/0261842 A1 | 9/2015 | Huang et al. |
| 2016/0011865 A1* | 1/2016 | Apte ........................ G06F 8/71 717/121 |
| 2017/0109685 A1 | 4/2017 | Bianchi et al. |
| 2019/0018729 A1 | 1/2019 | Shepard et al. |
| 2019/0212992 A1 | 7/2019 | Jonnadula et al. |

(Continued)

*Primary Examiner* — Bradley A Teets
*Assistant Examiner* — Clint Thatcher

(57) ABSTRACT

A processor performs a first scan of an environment associated with a software application and determines a first set of parameters indicative of characteristics of the environment. The processor performs a second scan of the component layers of the application and determines a second set of parameters indicative of characteristics of a software code associated with the application. The processor determines compatibility of a new technology with the environment based on the first set of parameters and with the application based on the second set of parameters. If the new technology is found compatible, the processor determines that the application can be upgraded based on the new technology.

20 Claims, 2 Drawing Sheets

(56) References Cited

U.S. PATENT DOCUMENTS

| | | | |
|---|---|---|---|
| 2020/0125353 A1 | 4/2020 | Bean et al. | |
| 2020/0142679 A1 | 5/2020 | Cillis et al. | |
| 2020/0387357 A1 | 12/2020 | Mathon et al. | |
| 2021/0089286 A1* | 3/2021 | Barkus | G06F 8/433 |
| 2022/0116208 A1 | 4/2022 | Stapleton et al. | |
| 2023/0401038 A1* | 12/2023 | Rajagopalan | G06F 8/60 |
| 2024/0256852 A1* | 8/2024 | Yuan | G06N 3/08 |

* cited by examiner

SYSTEM AND METHOD FOR UPGRADING A TECHNOLOGY STACK IN A COMPUTING INFRASTRUCTURE

TECHNICAL FIELD

The present disclosure relates generally to data processing, and more specifically to a system and method for upgrading a technology stack in a computing infrastructure.

BACKGROUND

The technology stack used by an organization determines the products that may be developed and effectiveness of those developed products. Inefficient legacy technology stacks may lead to slower performance, resulting in a poor user experience and a loss of potential customers. Inefficient technology stacks may also require more resources to maintain and scale, increasing operating costs and reducing profitability. An inefficient technology stack may also limit an organization's ability to take advantage of new technologies and opportunities, hindering its growth and competitiveness. Thus, it is critical for organizations to evaluate their technology stack and upgrade the technology stack as the needs of the organization changes.

SUMMARY

The system and method implemented by the system as disclosed in the present disclosure provide technical solutions to the technical problems discussed above by evaluating legacy technology stacks for upgrades to newer technologies.

For example, the disclosed system and methods provide the practical application of evaluating a legacy technology stack associated with a software application and determining whether the software application may be upgraded to a new/modem technology. As described in embodiments of the present disclosure, to evaluate a particular software application for a potential upgrade of the software application to one or more new technologies, upgrade manager determines a baseline of the environment associated with the software application by performing a first scan of the environment. Based on this first scan, upgrade manager determines a first parameter set, wherein each determined parameter in the first parameter set is indicative of a particular characteristic of the environment in which the software application is operating. Upgrade manager further determines a baseline associated with the particular software application by performing a second scan of the particular software application. This second scan includes scanning component layers of the particular application including scanning one or more of a model layer, a controller layer, and a view layer associated with the particular application. Based on this second scan, upgrade manager determines a second parameter set, wherein each determined parameter in the second parameter set is indicative of a particular characteristic of the software code associated with the particular software application. Upgrade manager identifies a new technologies that corresponds to a legacy technology associated with the particular software application and that may be used to upgrade the particular software application. Once the new technology is identified, upgrade manager determines compatibility of the new technology with the environment associated with the software application based on the first parameter set, and further determines compatibility of the identified new technology with the particular software application based on the second parameter set. In response to determining that the new technology is compatible with the environment as well as the particular software application, upgrade manager determines that the particular software application is upgradable to the identified new technology. Upgrade manager may initiate the upgrade of the software application to the new technology.

There are several technical advantages of upgrading a technology stack to a new technology based on the embodiments of the present disclosure including, but not limited to, improving performance and scalability of the upgraded software application and computing systems associated with the software application, better support for new technologies and features, improved data security, improved productivity and efficiency of associated computing systems, and improved system security.

Thus, the disclosed system and method generally improve the technology associated with a computing infrastructure.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
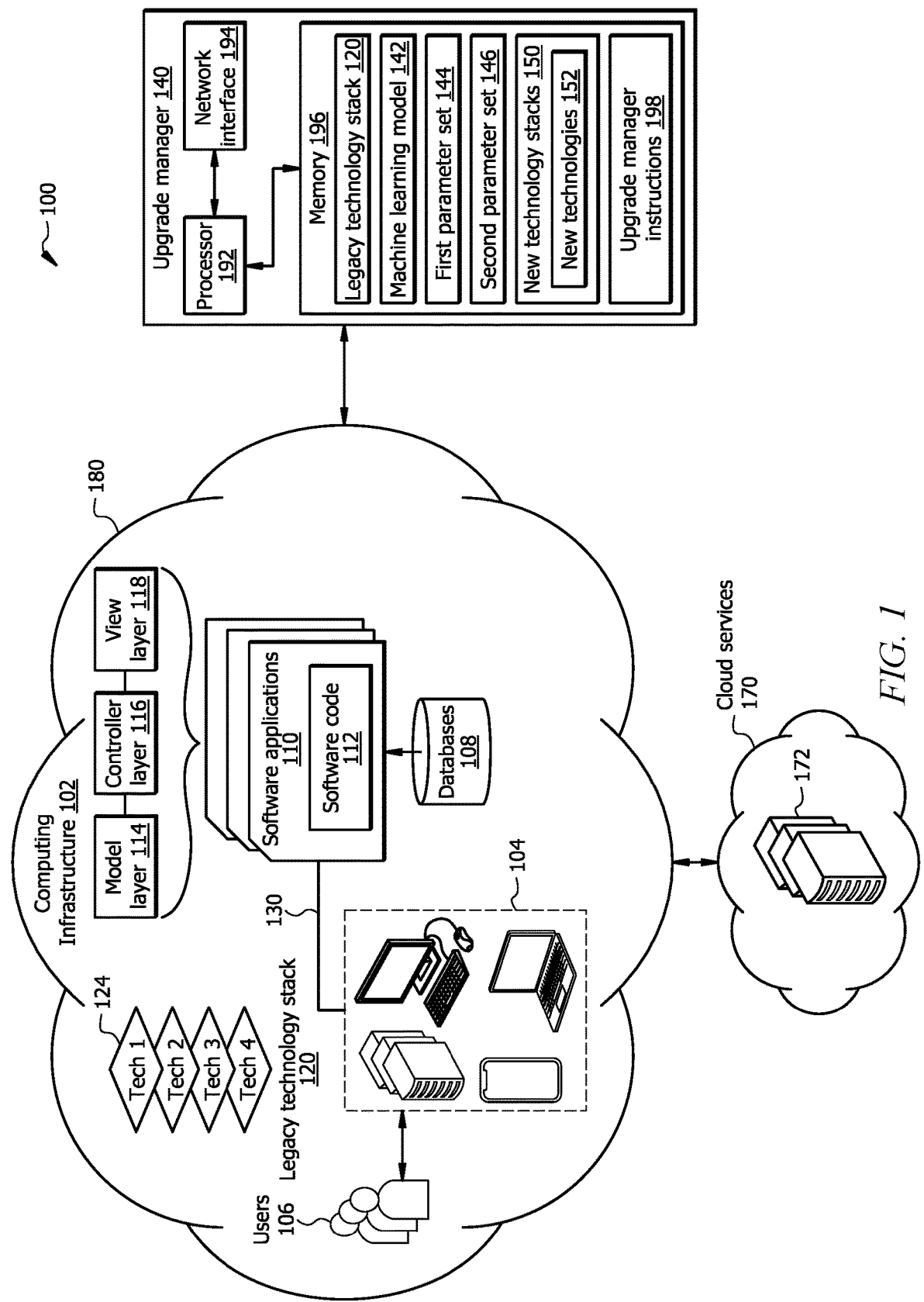
FIG. 1 is a schematic diagram of a system, in accordance with certain aspects of the present disclosure.

FIG. 1 is a schematic diagram of a system 100, in accordance with certain aspects of the present disclosure. As shown, system 100 includes a computing infrastructure 102 and a cloud service 170 connected to a network 180. Computing infrastructure 102 may include a plurality of hardware and software components. The hardware components may include, but are not limited to, computing nodes 104 such as desktop computers, smartphones, tablet computers, laptop computers, servers and data centers, mainframe computers, virtual reality (VR) headsets, augmented reality (AR) glasses and other hardware devices such as printers, routers, hubs, switches, and memory devices (e.g., databases 108) all connected to the network 180. Software components may include software applications (e.g., software applications 110) that are run by one or more of the computing nodes 104 including, but not limited to, operating systems, user interface applications, third party software, database management software, service management software, mainframe software, metaverse software and other customized software programs implementing particular functionalities. For example, software code (e.g., software code 112) relating to one or more software applications 110 may be stored in a memory device (e.g., database 108) and one or more processors (e.g., belonging to one or more computing nodes 104) may execute the software code 112 to implement respective functionalities. In one embodiment, at least a portion of the computing infrastructure 102 may be representative of an Information Technology (IT) infrastructure of an organization. In one embodiment, one or more software applications 110 or portions thereof may be stored in one or more databases 108 of the computing infrastructure 102.

In one embodiment, at least a portion of the computing infrastructure may implement a mainframe system (not shown). The term "mainframe" generally refers to a large computer system designed to process very large amounts of data quickly. A typical mainframe system includes high-performance computers (e.g., computing nodes 104) with large amounts of memory and processors that process billions of calculations and data interactions in real time. In one example, at least a portion of the databases 108 of the computing infrastructure 102 may be associated with a mainframe system and may be configured to store data and software applications 110 (e.g., mainframe applications) associated with the mainframe system. Mainframe systems are widely used in industries like the financial sector, airline reservations, logistics and other fields where a large number of transactions need to be processed as part of routine business practices.

One or more of the computing nodes 104 may be operated by a user 106. For example, a computing node 104 may provide a user interface using which a user 106 may operate the computing node 104 to perform data interactions within the computing infrastructure 102.

One or more computing nodes 104 of the computing infrastructure 102 may be representative of a computing system which hosts software applications that may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the computing nodes 104 may be representative of a server running one or more software applications to implement respective functionality (e.g., upgrade manager 140) as described below. In certain embodiments, one or more of the computing nodes 104 may run a thin client software application where the processing is directed by the thin client but largely performed by a central entity such as a server (not shown).

Network 180, in general, may be a wide area network (WAN), a personal area network (PAN), a cellular network, or any other technology that allows devices to communicate electronically with other devices. In one or more embodiments, network 180 may be the Internet.

At least a portion of the computing infrastructure 102 may include a cloud service 170. For example, a portion of the computing nodes 104 may include cloud servers 172 associated with the cloud service 170. The term "cloud services" generally refers to a wide range of services delivered on demand to companies and users over the internet. These services are designed to provide easy, affordable access to software applications (e.g., software applications 110) and other resources. Cloud services such as cloud service 170 are generally managed by cloud service providers.

The cloud service 170 may include a set of one or more hardware resources and software resources. In this context a hardware resource may include but is not limited to, a processor, a memory device, a server, a database, or any other hardware device, machine or component. For example, cloud service 170 includes a plurality of cloud servers 172. A software resource may include, but is not limited to, a software program or application such as an operating system, user interface or other customized software that can implement one or more functionalities. For example, one or more of the software applications 110 may be implemented by one or more cloud servers 172. In one embodiment, cloud service 170 may provide pre-configured cloud instances (not shown), wherein each cloud instance of the cloud service includes a unique set of hardware and/or software resources. In cloud computing, a cloud instance generally refers to a virtual machine that uses one or more hardware and/or software resources of a cloud infrastructure to run a workload/job. The term "workload" or "job" generally refers to an application or service deployed using a computing machine (e.g., virtual machine) that consumes resources such as computing power and memory. In addition to the pre-configured cloud instances, the cloud service 170 may allow customized cloud instances to be created to cater to customized needs. Thus, at least a portion of the computing infrastructure 102 including one or more hardware components and/or one or more software components may be implemented by the cloud service 170 using cloud servers 172.

A software application 110 may be associated with an environment 130 in which the software application 110 may be developed and run. In the context of creating and deploying a software application 110, the term "environment" generally refers to a subset of infrastructure resources (e.g., hardware components and software components) used to execute the software application 110 under specific constraints. For example, a portion of the computing infrastructure 102 may form an environment 130 associated with a particular software application 110, wherein the environment 130 may include a hardware environment including a plurality of hardware components such as computers, servers, processors, and memory devices, and/or a software environment including a plurality of software components such as software programs, libraries, and utilities. In one embodiment, the software environment associated with a software application 110 may be part of the technology stack 120 associated with the software application 110. Example environments 130 associated with a software application 110 may include, but are not limited to a development environment, an integration environment, a testing environment, a staging environment and a production environment.

One or more software applications 110 may be associated with a technology stack (e.g., legacy technology stack 120) including a plurality of component technologies 124. The term "technology stack" generally refers to a combination of technologies 124 including software, programming languages, frameworks, and data storage technologies with which software developers may build and run a software application 110. For example, a typical technology stack may include one or more frontend (client/user side) technologies/tools and one or more backend (server-side) technologies/tools. Example frontend technologies may include JavaScript, CSS, HTML, UI libraries, and frameworks, while example backend technologies may include servers and operating systems, programming languages, web frameworks, and databases. A technology stack aims to maximize efficiency, productivity, performance, and security associated with development and performance of a software application 110. With the right tools and technology at their disposal, developers can build a product much faster, with fewer roadblocks, and also be able to predict how much time and budget the project might need. A technology stack 120 used for a particular software application 110, among other things, may have an impact on how the software application 110 functions now and in the future, how easy to maintain and scalable the software application 110 is, whether the application 110 meets the objectives of a project, and how and where the data associated with the application 110 is stored (e.g., local vs cloud storage).

The technology stack 120 used by an organization determines the products that may be developed and effectiveness of those developed products. Inefficient technology stacks (e.g., legacy technology stacks 120) may lead to slower performance, resulting in a poor user experience and a loss of potential customers. Inefficient technology stacks may also require more resources to maintain and scale, increasing operating costs and reducing profitability. An inefficient technology stack may also limit an organization's ability to take advantage of new technologies and opportunities, hindering its growth and competitiveness. Thus, it is critical for organizations to evaluate their technology stack and upgrade the technology stack as the needs of the organization changes. There may be several benefits to upgrading a technology stack including, but not limited to, improving performance and scalability, better support for new technologies and features, improved security, improved productivity and efficiency, improved security, reduced maintenance cost, and competitive advantage.

Embodiments of the present disclosure describe techniques for evaluating a legacy technology stack 120 associated with a software application and determine whether the software application 110 may be upgraded to a new/modem technology.

As shown in FIG. 1, one or more software applications 110 may be associated with a legacy technology stack 120 that includes one or more legacy technologies 124. The legacy technology stack 120 may include a combination of legacy technologies 124 such as computer software, programming languages, frameworks, and data storage technologies with which software developers may build, run and maintain a software application 110. The term "legacy technology 124" in the context of the present disclosure may refer to any technology tool (e.g., computer software, programming languages, frameworks, and data storage technologies etc.) that is currently being used by an organization to develop, run and maintain software applications 110. In one example, a legacy technology 124 may include an old or out-of-date technology that continues to be used by an organization to develop, run and maintain one or more software applications 110.

At least a portion of the computing infrastructure 102 may implement upgrade manager 140 which may perform a plurality of operations associated with evaluating a software application 110 and an associated legacy technology stack 120 for an upgrade to one or more new technologies 152 (e.g., belonging to one or more new technology stacks 150). Upgrade manager 140 may further be configured to upgrade a software application 110 to a new/modem technology (e.g., new technology 152). In this context, upgrade manager 140 may be configured to store information associated with a plurality of new technologies 152, wherein each of the new technologies 152 may be associated with a new/modern technology stack 150. In the context of the present disclosure a "new technology 152" refers to a modem technology that is newer than a corresponding legacy technology 124 of the legacy technology stack 120 being used by the computing infrastructure 102 to develop, run and maintain one or more software applications 110. For example, a new technology stack 150 may include a combination of new technologies 152 such as computer software, programming languages, frameworks, and data storage technologies with which software developers may build, run and maintain a software application 110. In one embodiment, a new technology 152 may provide several benefits over a corresponding legacy technology 124 including, but not limited to, improving performance and scalability, better support for new technologies and features, improved security, improved productivity and efficiency, reduced maintenance cost, and competitive advantage. Upgrade manager 140 may store a plurality of new technology stacks 150, wherein each new technology stack 150 may include a plurality of new technologies 152. In one embodiment, each technology stack 150 and associated new technologies 152 may include new and emerging technologies for developing, running and maintaining one or more software applications 110 in the computing infrastructure 102.

The upgrade manager 140 comprises a processor 192, a memory 196, and a network interface 194. The upgrade manager 140 may be configured as shown in FIG. 1 or in any other suitable configuration.

The processor 192 comprises one or more processors operably coupled to the memory 196. The processor 192 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 192 may be a programmable logic device, a microcontroller, a microprocessor, or any suitable combination of the preceding. The processor 192 is communicatively coupled to and in signal communication with the memory 196. The one or more processors are configured to process data and may be implemented in hardware or software. For example, the processor 192 may be 8-bit, 16-bit, 32-bit, 64-bit or of any other suitable architecture. The processor 192 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions, such as software instructions. For example, the one or more processors are configured to execute instructions (e.g., upgrade manager instructions 198) to implement the upgrade manager 140. In this way, processor 192 may be a special-purpose computer designed to implement the functions disclosed herein. In one or more embodiments, the upgrade manager 140 is implemented using logic units, FPGAs, ASICs, DSPs, or any other suitable hardware. The upgrade manager 140 is configured to operate as described with reference to FIG. 2. For example, the processor 192 may be configured to perform at least a portion of the method 200 as described in FIG. 2.

The memory 196 comprises one or more disks, tape drives, or solid-state drives, and may be used as an over-flow data storage device, to store programs when such programs are selected for execution, and to store instructions and data that are read during program execution. The memory 196 may be volatile or non-volatile and may comprise a read-only memory (ROM), random-access memory (RAM), ternary content-addressable memory (TCAM), dynamic random-access memory (DRAM), and static random-access memory (SRAM).

The memory 196 is operable to store machine learning model 142, first parameter set 144, second parameter set 146, legacy technology stack 120, new technology stacks 150, new technologies 152 and the upgrade manager instructions 198. The upgrade manager instructions 198 may include any suitable set of instructions, logic, rules, or code operable to execute the upgrade manager 140.

The network interface 194 is configured to enable wired and/or wireless communications. The network interface 194 is configured to communicate data between the upgrade manager 140 and other devices, systems, or domains (e.g. computing nodes 104, cloud servers 172 etc.). For example, the network interface 194 may comprise a Wi-Fi interface, a LAN interface, a WAN interface, a modem, a switch, or a router. The processor 192 is configured to send and receive data using the network interface 194. The network interface 194 may be configured to use any suitable type of communication protocol as would be appreciated by one of ordinary skill in the art.

It may be noted that each of the computing nodes 104 and cloud servers 172 may be implemented like the transform manager 140 shown in FIG. 1. For example, each of the computing nodes 104 and cloud servers 172 may have a respective processor and a memory that stores data and instructions to perform operations discussed above.

To evaluate a particular software application 110 for a potential upgrade of the software application 110 to one or more new technologies 152, upgrade manager 140 may be configured to determine a baseline of the environment 130 associated with the software application 110 by performing a first scan of the environment 130. The term "baseline" generally identifies an agreed-to description of the attributes of a system at a point in time and provides a known configuration to which changes to the system may be addressed. As described above, an environment 130 associated with a software application 110 refers to a subset of infrastructure resources (e.g., hardware components and software components) used to execute the software application 110 under specific constraints. Thus, scanning the environment 130 associated with the particular software application 110 may include scanning one or more hardware components (e.g., computing nodes 104) and/or scanning one or more software components (e.g., other software applications 110 that may interact with the particular software application, technology stack 120 etc.) that are part of the environment associated with the software application 110. Based on the scan of the environment 130 associated with the particular software application 110, upgrade manager 140 may be configured to determine a first parameter set 144, wherein each determined parameter in the first parameter set 144 is indicative of a particular characteristic of the environment 130 in which the software application 110 is operating. The first parameter set 144 represents the baseline associated with the environment 130 in which the particular software application 110 is being operated.

A first example parameter in the determined first parameter set 144 may include a level/degree of complexity associated with the environment 130. For example, a mainframe typically has a very complex environment including several complex systems, sub-systems and applications running in tandem. The complexity of this type of environment is by design and needs to be maintained through any technology upgrade. However, the degree of complexity of an environment 130 associated with an application 110 may render upgrading the application difficult and cost prohibitive. This first parameter may indicate whether the complexity of the environment 130 associated with the particular software application 110 being investigated allows upgrading the software application 110 to one or more newer technologies 152. For example, when a particular new technology 152 is unable to maintain the necessary degree of complexity associated with the particular software application 110, upgrade manager 140 may determine that the particular application 110 may not be upgraded to the new technology 152.

A second example parameter in the determined first parameter set 144 may include a level/degree of data consistency defined for data that is processed in the environment 130. An organization may define and mandate several rules relating to maintaining data consistency across systems and applications running in an environment 130. A new technology may need to at least maintain a minimum level of data consistency defined and mandated for data associated with the environment 130. This second parameter may indicate whether the data consistency rules laid down relating to the environment 130 associated with the particular software application 110 being investigated allows upgrading the software application 110 to one or more newer technologies 152. For example, when a particular new technology 152 is unable to satisfy/maintain the necessary data consistency defined for the particular software application 110, upgrade manager 140 may determine that the particular application 110 may not be upgraded to the new technology 152.

A third example parameter in the determined first parameter set 144 may include a level/degree of collaboration between the particular software application 110 and at least one of an upstream software application 110 and a downstream application 110 in the environment 130. Often a software application 110 collaborates with one or more upstream applications 110 and/or one or more downstream applications 110. This collaboration may include exchanging data with the one or more upstream applications 110 and/or the one or more downstream applications 110. Thus, a new technology 152 used to upgrade the particular application 110 may need to be compatible with the upstream applications 110 and/or downstream applications 110 so that the collaboration may be maintained after an upgrade of the particular software application 110. This third parameter may indicate whether the degree of collaboration that currently exists in the legacy system between the particular software application 110 and at least one of an upstream software application 110 and a downstream application 110 allows upgrading the software application 110 to one or more newer technologies 152. For example, when a particular new technology 152 is unable to maintain this collaboration, alarms manager 140 may determine that the particular application 110 may not be upgraded to the new technology 152.

A fourth example parameter in the determined first parameter set 144 may include a level/degree of flexibility associated with upgrading the software code 112 associated with the particular software application 110. A degree of flexibility associated with upgrading the software code 112 may depend on several factors including, but not limited to, a quality of the software code 112, a complexity of the software code 112, and rules defined for security of the software code 112 in the environment 130. This fourth parameter may indicate whether the degree of flexibility associated with upgrading the software code 112 associated with the particular software application 110 allows upgrading the software application 110 to one or more newer technologies 152. For example, when the determined degree of flexibility needed to upgrade the particular software application 110 to a particular new technology 152 is not sufficient for the upgrade to the new technology 152, alarms manager 140 may determine that the particular application 110 may not be upgraded to the new technology 152.

Upgrade manager 140 may be configured to further evaluate the potential upgrade of the software application 110 to one or more new technologies 152 by determining a baseline associated with the particular software application 110. To determine the baseline associated with the particular software application 110, upgrade manager 140 may perform a second scan of the particular software application 110. This second scan may include scanning component layers of the particular application 110 including scanning one or more of a model layer 114, a controller layer 116, and a view layer 118 associated with the particular application 110. The Model-view-controller (MVC) is a software design pattern that is commonly used for developing software applications 110 and that divides the program logic associated with the software application 110 into three interconnected elements namely model layer 114, view layer 118 and controller layer 116. For example, the MVC pattern is popular for designing web applications. The model layer 114 is a central component of the pattern and is responsible for managing data, logic and rules of an application 110. Essentially, the model layer 114 implements the logic of the application 110. The model layer 114 is responsible for retrieving data and converting it into meaningful concepts for the application 110. This includes processing, validating, associating or other tasks related to handling data associated with the application 110. The view layer 118 renders a presentation of the modeled data such as a chart, diagram or table. The view layer 118 may generate multiple views of the same information, such as a bar chart for management and a tabular view for accountants. The controller layer 116 handles requests from users and is responsible for rendering a response with the aid of both the model layer 114 and view layer 118. For example, the controller layer 116 accepts input and converts it to commands for the model layer 114 and view layer 118.

Based on this second scan of the particular application 110, upgrade manager 140 may be configured to determine a second parameter set 146, wherein each determined parameter in the second parameter set 146 is indicative of a particular characteristic of the software code 112 associated with the particular software application 110. Thus, the second parameter set 146 represents a baseline associated with the particular software application 110 being investigated for a potential upgrade to one or more new technologies 152.

A first example parameter included in the second parameter set 146 may include an indication of an ease of updating the software code 112 associated with the particular application 110. This may include an indication of whether the software code 112 associated with the particular application 110 may be updated using low code application development tools. This first parameter may indicate whether the ease of updating the software code 112 associated with the particular application 110 allows upgrading the software application 110 to one or more newer technologies 152. For example, when the determined ease of upgrading the software code 112 indicates that the software code 112 may not be upgraded using low-code application development tools (e.g., associated with a new technology 152), upgrade manager 140 may determine that the particular application 110 may not be upgraded to the new technology 152. For example, in some cases an owner of the computing infrastructure 102 may mandate certain secure coding practices which may add complexity to the software code 112, which in turn may not allow use of low-code application development tools. In this case, the software code 112 may not be upgradable using new technologies 152 that use low-code application development.

A second example parameter included in the second parameter set 146 may include an indication of an amount of technical debt associated with the software code 112 of the particular application 110. In one embodiment, the technical debt associated with the software code 112 may indicate a cost associated with upgrading the software code 112. The term "technical debt" typically refers to the implied cost incurred when organizations do not fix problems in the software code 112 that will affect them in the future. Accruing technical debt often causes existing problems to get worse over time. The longer the technical debt builds up, the more costly it becomes to rectify issues with the software code 112 that have built over time. For example, costs associated with subject matter experts (SMEs) may get higher with time. Thus, the longer the technical debt builds, the higher are the costs for rectifying the software code 112 using SMEs. A software code 112 with high technical debt is generally difficult and costlier to upgrade to a new technology 152. On the other hand, a mature software code 112 that has been constantly updated over time to avoid built up of technical debt is easier and cheaper to upgrade to a new technology 152. This second parameter may indicate whether the technical debt associated with the software code 112 of the particular application 110 allows upgrading the software application 110 to one or more newer technologies 152. For example, when the determined technical debt associated with the software code 112 is higher than a pre-set threshold, upgrade manager 140 may determine that the particular application 110 may not be upgraded to the new technology 152.

Upgrade manager 140 may be configured to determine one or more new technologies 152 based on which the particular software application 110 may be upgraded. As described above, upgrade manager 140 may be configured to store information associated with a plurality of new technologies 152, wherein one or more of the new technologies 152 may be associated with one or more new/modern technology stacks 150. In the context of the present disclosure a "new technology 152" refers to a modern technology that is newer than a corresponding legacy technology 124 of the legacy technology stack 120 being used by the computing infrastructure 102 to develop, run and maintain one or more software applications 110. In one embodiment, upgrade manager 140 may store information associated with one or more new technologies 152 corresponding to a legacy technology 124 that is currently being used in the computing infrastructure 102 to develop, run and maintain the particular software application 110. Information associated with a particular new technology 152 may include a plurality of attributes associated with the new technology 152 that may indicate a compatibility of the new technology 152 with a software application 110 and one or more legacy technologies 124 of the legacy technology stack 120. Upgrade manager 140 may be configured to identify one or more new technologies 152 that corresponds to a legacy technology 124 associated with the particular software application 110 and that may be used to upgrade the particular software application 110. For example, one or more attributes associated with a new technology 152 may indicate a type associated with the new technology 152. For example, when an attribute associated with a new technology 152 indicates that the new technology 152 is a modern operating system, upgrade manager 140 may match a legacy technology 124 that is a legacy operating system with the modem operating system.

Once a new technology 152 that may be potentially used to upgrade the particular software application 110 is identified, upgrade manager 140 may be configured to determine whether the new technology 152 can be used to upgrade the particular software application. This may include determining compatibility of the identified new technology 152 with the environment 130 associated with the particular software application 110 that is being evaluated for upgrade, and further determining compatibility of the identified new technology 152 with the particular software application 110.

Upgrade manager 140 may be configured to determine compatibility of the identified new technology 152 with the environment 130 associated with the particular software application based on the first parameter set 144. As described above, the first parameter set 144 represents the baseline associated with the environment 130 in which the particular software application 110 is being operated and includes parameters that are indicative of various characteristics of the environment 130.

In a first example, when a first parameter of the first parameter set 144 indicates a level/degree of complexity associated with the environment 130 associated with the particular software application 110, upgrade manager 140 determines whether the particular software application 110, when upgraded based on the new technology 152, supports and/or maintains the same level of complexity associated with the environment 130. In response to determining that the upgraded software application 110 supports and/or maintains the same level/degree of complexity associated with the environment 130, upgrade manager 140 may be configured to determine that the new technology 152 is compatible with the environment 130 with regard to the first parameter.

In a second example, when a second parameter of the first parameter set 144 indicates a level/degree of data consistency defined for data that is processed in the environment 130, upgrade manager 140 determines whether the particular software application 110, when upgraded based on the new technology 152, at least maintains the level/degree of data consistency defined for the data that is processed in the environment 130. In response to determining that the upgraded software application 110 at least maintains the level/degree of data consistency defined for the data that is processed in the environment 130, upgrade manager 140 may be configured to determine that the new technology 152 is compatible with the environment 130 with regard to the second parameter.

In a third example, when a third parameter of the first parameter set 144 indicates a level/degree of collaboration between the particular software application 110 and at least one of an upstream application 110 and a downstream application 110 in the environment 130, upgrade manager 140 may be configured to determine whether the particular software application 110, when upgraded based on the new technology 152, supports and/or maintains the level/degree of collaboration between the particular software application 110 and at least one of the upstream software application 110 and the downstream application 110 in the environment 130. In response to determining that the upgraded software application 110 supports and/or maintains the level/degree of collaboration between the particular software application 110 and at least one of the upstream software application 110 and the downstream application 110 in the environment 130, upgrade manager 140 may be configured to determine that the new technology 152 is compatible with the environment 130 with regard to the third parameter.

In a fourth example, when a fourth parameter of the first parameter set 144 indicates level/degree of flexibility associated with upgrading the software code 112 associated with the particular software application 110, upgrade manager 140 may be configured to determine whether the level of flexibility associated with upgrading the software code 112 based on the new technology 152 equals or exceeds a threshold. In response to determining that the level of flexibility equals or exceeds the threshold, upgrade manager 140 may be configured to determine that the new technology 152 is compatible with the environment 130 with regard to the fourth parameter.

Upgrade manager 140 may be configured to determine compatibility of the identified new technology 152 with the particular software application 110 based on the second parameter set 146. As described above, the second parameter set 146 represents a baseline associated with the particular software application 110 being investigated for a potential upgrade to the new technology 152 and includes parameters indicative of particular characteristics of the software code 112 associated with the particular software application 110.

In a first example, when a first parameter from the second parameter set 146 indicates an ease of updating the software code 112 associated with the particular application 110, upgrade manager 140 may be configured to determine whether the ease of updating the software code 112 associated with the particular application 110 allows upgrading the software application 110 to the new technology 152. For example, the first parameter may indicate whether the software code 112 may be upgraded using low-code application development tools (e.g., associated with the new technology 152). In response to determining that the software code 112 may be upgraded using low-code application development tools associated with the new technology 152, upgrade manager 140 may be configured to determine that the new technology 152 is compatible with the particular application 110 with regard to the first parameter of the second parameter set 146.

In a second example, when a second parameter from the second parameter set 146 indicates an amount of technical debt associated with the software code 112 associated with the particular application 110, upgrade manager 140 may be configured to determine whether the technical debt associated with the software code 112 equals or is below a threshold technical debt. In response to determining that the technical debt associated with the software code 112 equals or is below a threshold technical debt, upgrade manager 140 may be configured to determine that the new technology 152 is compatible with the particular application 110 with regard to the second parameter of the second parameter set 146.

Upgrade manager 140 may be configured to determine whether the particular software application is upgradable to the identified new technology 152 based on whether the new technology 152 is compatible with one or more of the environment 130 associated with the particular software application 110, and with the particular software application 110 (e.g., software code 112 associated with the particular application 110). In one embodiment, upgrade manager 140 may be configured to determine that the particular software application 110 is upgradable to the identified new technology 152 in response to determining that the new technology 152 is compatible with the environment 130 associated with the particular software application 110 based on one or more parameter from the first parameter set 144. In an alternative or additional embodiment, upgrade manager 140 may be configured to determine that the particular software application 110 is upgradable to the identified new technology 152 in response to determining that the new technology 152 is compatible with the particular software application 110 (e.g., software code 112 associated with the particular application 110) based on one or more parameters from the second parameter set 146. In an additional or alternative embodiment, upgrade manager 140 may be configured to determine that the particular software application 110 is upgradable to the identified new technology 152 in response to determining that the new technology 152 is compatible with the environment 130 as well as the particular software application 110. Upgrading the particular software application 110 may include updating the software code 112 associated with the particular software application 110 based on the new technology. Updating the software code 112 may include editing the software code 112, re-writing portions of the software code 113 or re-writing the entire software code 112.

In one or more embodiments, in response to determining that the particular software application 110 is upgradable based on the new technology 152, upgrade manager 140 may be configured to generate a message including an indication that the particular application 110 new technology 152 can be upgraded based on the particular new technology 152. This message may be transmitted to one or more support teams responsible for upgrading systems within the computing infrastructure 102. One or more support team members may then upgrade the particular application 110 based on the new technology 152 by updating the software code 112 associated with the particular application 110. In an additional or alternative embodiment, in response to determining that the particular software application 110 is upgradable based on the new technology 152, upgrade manager 140 may be configured to automatically update the software code 112 to upgrade the particular application 110 based on the new technology 152.

In one or more embodiments, upgrade manager 140 may employ a machine learning model 142 to perform one or more operations of the upgrade manager 140 described in the present disclosure with regard to evaluating a software application 110 and an associated legacy technology stack 120 for an upgrade to one or more new technologies 152 (e.g., belonging to one or more new technology stacks 150) and further upgrading the software application 110 to a new/modern technology (e.g., new technology 152).

Figure 2:
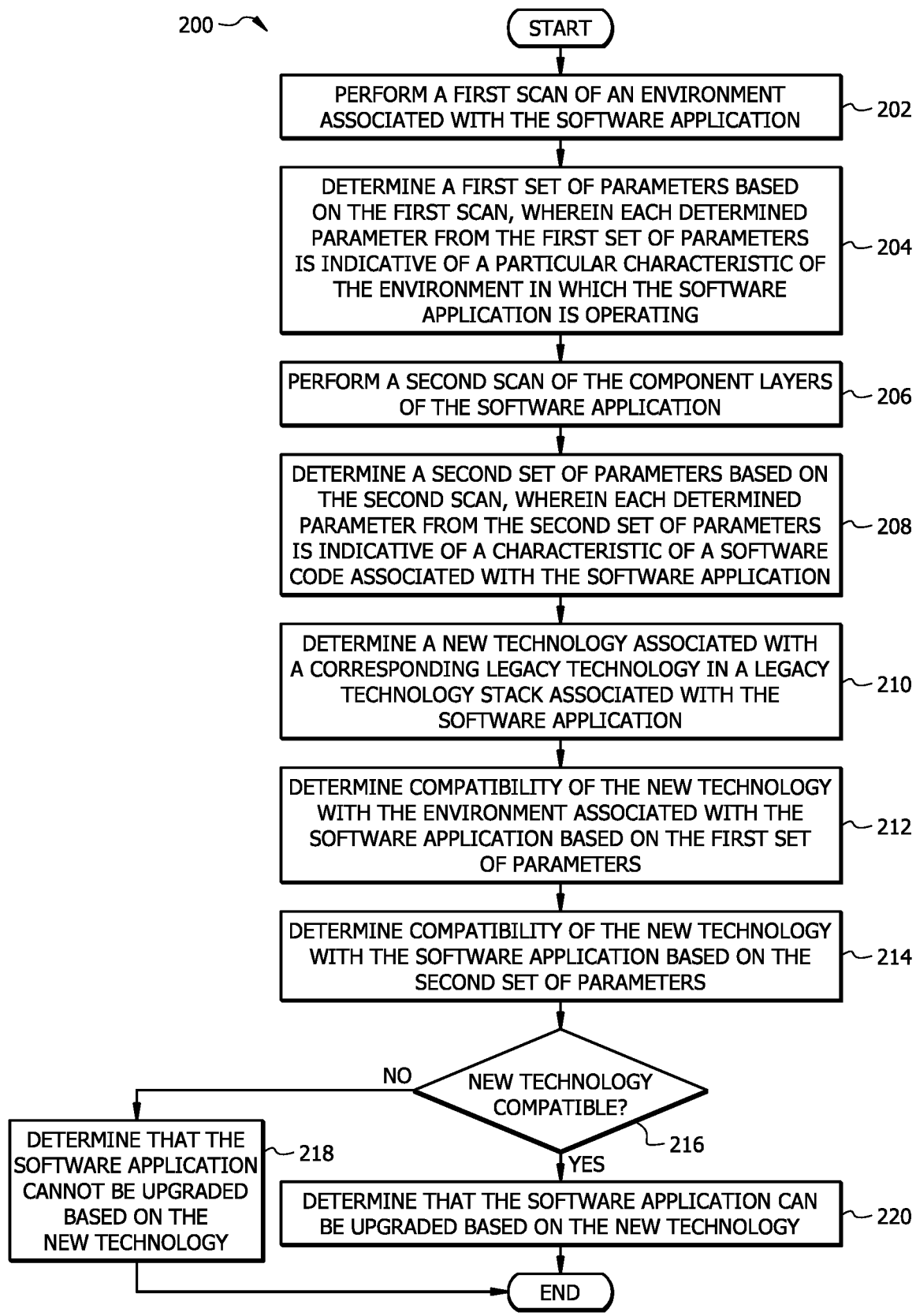
FIG. 2 illustrates a flowchart of an example method for upgrading a software application to a new technology, in accordance with one or more embodiments of the present disclosure.

FIG. 2 illustrates a flowchart of an example method 200 for upgrading a software application 110 to a new technology 152, in accordance with one or more embodiments of the present disclosure. Method 200 may be performed by the upgrade manager 140 shown in FIG. 1.

At operation 202, upgrade manager 140 performs a first scan of an environment 130 associated with a software application 110, wherein the environment 130 includes a plurality of hardware and software components associated with the software application 110.

As described above, to evaluate a particular software application 110 for a potential upgrade of the software application 110 to one or more new technologies 152, upgrade manager 140 may be configured to determine a baseline of the environment 130 associated with the software application 110 by performing a first scan of the environment 130. The term "baseline" generally identifies an agreed-to description of the attributes of a system at a point in time and provides a known configuration to which changes to the system may be addressed. As described above, an environment 130 associated with a software application 110 refers to a subset of infrastructure resources (e.g., hardware components and software components) used to execute the software application 110 under specific constraints. Thus, scanning the environment 130 associated with the particular software application 110 may include scanning one or more hardware components (e.g., computing nodes 104) and/or scanning one or more software components (e.g., other software applications 110 that may interact with the particular software application, technology stack 120 etc.) that are part of the environment associated with the software application 110.

At operation 204, upgrade manager 140 determines a first set of parameters (e.g., first parameter set 144) based on the first scan, wherein each determined parameter from the first set of parameters is indicative of a particular characteristic of the environment 130 in which the software application 110 is operating.

As described above, based on the scan of the environment 130 associated with the particular software application 110, upgrade manager 140 may be configured to determine a first parameter set 144, wherein each determined parameter in the first parameter set 144 is indicative of a particular characteristic of the environment 130 in which the software application 110 is operating. The first parameter set 144 represents the baseline associated with the environment 130 in which the particular software application 110 is being operated.

A first example parameter in the determined first parameter set 144 may include a level/degree of complexity associated with the environment 130. For example, a mainframe typically has a very complex environment including several complex systems, sub-systems and applications running in tandem. The complexity of this type of environment is by design and needs to be maintained through any technology upgrade. However, the degree of complexity of an environment 130 associated with an application 110 may render upgrading the application difficult and cost prohibitive. This first parameter may indicate whether the complexity of the environment 130 associated with the particular software application 110 being investigated allows upgrading the software application 110 to one or more newer technologies 152. For example, when a particular new technology 152 is unable to maintain the necessary degree of complexity associated with the particular software application 110, upgrade manager 140 may determine that the particular application 110 may not be upgraded to the new technology 152.

A second example parameter in the determined first parameter set 144 may include a level/degree of data consistency defined for data that is processed in the environment 130. An organization may define and mandate several rules relating to maintaining data consistency across systems and applications running in an environment 130. A new technology may need to at least maintain a minimum level of data consistency defined and mandated for data associated with the environment 130. This second parameter may indicate whether the data consistency rules laid down relating to the environment 130 associated with the particular software application 110 being investigated allows upgrading the software application 110 to one or more newer technologies 152. For example, when a particular new technology 152 is unable to satisfy/maintain the necessary data consistency defined for the particular software application 110, upgrade manager 140 may determine that the particular application 110 may not be upgraded to the new technology 152.

A third example parameter in the determined first parameter set 144 may include a level/degree of collaboration between the particular software application 110 and at least one of an upstream software application 110 and a downstream application 110 in the environment 130. Often a software application 110 collaborates with one or more upstream applications 110 and/or one or more downstream applications 110. This collaboration may include exchanging data with the one or more upstream applications 110 and/or the one or more downstream applications 110. Thus, a new technology 152 used to upgrade the particular application 110 may need to be compatible with the upstream applications 110 and/or downstream applications 110 so that the collaboration may be maintained after an upgrade of the particular software application 110. This third parameter may indicate whether the degree of collaboration that currently exists in the legacy system between the particular software application 110 and at least one of an upstream software application 110 and a downstream application 110 allows upgrading the software application 110 to one or more newer technologies 152. For example, when a particular new technology 152 is unable to maintain this collaboration, alarms manager 140 may determine that the particular application 110 may not be upgraded to the new technology 152.

A fourth example parameter in the determined first parameter set 144 may include a level/degree of flexibility associated with upgrading the software code 112 associated with the particular software application 110. A degree of flexibility associated with upgrading the software code 112 may depend on several factors including, but not limited to, a quality of the software code 112, a complexity of the software code 112, and rules defined for security of the software code 112 in the environment 130. This fourth parameter may indicate whether the degree of flexibility associated with upgrading the software code 112 associated with the particular software application 110 allows upgrading the software application 110 to one or more newer technologies 152. For example, when the determined degree of flexibility needed to upgrade the particular software application 110 to a particular new technology 152 is not sufficient for the upgrade to the new technology 152, alarms manager 140 may determine that the particular application 110 may not be upgraded to the new technology 152.

At operation 206, upgrade manager 140 performs a second scan of the component layers of the software application 110, wherein the component layers comprise a model layer 114, a controller layer 116 and a view layer 118.

As described above, upgrade manager 140 may be configured to further evaluate the potential upgrade of the software application 110 to one or more new technologies 152 by determining a baseline associated with the particular software application 110. To determine the baseline associated with the particular software application 110, upgrade manager 140 may perform a second scan of the particular software application 110. This second scan may include scanning component layers of the particular application 110 including scanning one or more of a model layer 114, a controller layer 116, and a view layer 118 associated with the particular application 110. The Model-view-controller (MVC) is a software design pattern that is commonly used for developing software applications 110 and that divides the program logic associated with the software application 110 into three interconnected elements namely model layer 114, view layer 118 and controller layer 116. For example, the MVC pattern is popular for designing web applications. The model layer 114 is a central component of the pattern and is responsible for managing data, logic and rules of an application 110. Essentially, the model layer 114 implements the logic of the application 110. The model layer 114 is responsible for retrieving data and converting it into meaningful concepts for the application 110. This includes processing, validating, associating or other tasks related to handling data associated with the application 110. The view layer 118 renders a presentation of the modeled data such as a chart, diagram or table. The view layer 118 may generate multiple views of the same information, such as a bar chart for management and a tabular view for accountants. The controller layer 116 handles requests from users and is responsible for rendering a response with the aid of both the model layer 114 and view layer 118. For example, the controller layer 116 accepts input and converts it to commands for the model layer 114 and view layer 118.

At operation 208, upgrade manager 140 determines a second set of parameters (e.g., second parameter set 146) based on the second scan, wherein each determined parameter from the second set of parameters is indicative of a characteristic of a software code 112 associated with the software application 110.

As describe above, based on this second scan of the particular application 110, upgrade manager 140 may be configured to determine a second parameter set 146, wherein each determined parameter in the second parameter set 146 is indicative of a particular characteristic of the software code 112 associated with the particular software application 110. Thus, the second parameter set 146 represents a baseline associated with the particular software application 110 being investigated for a potential upgrade to one or more new technologies 152.

A first example parameter included in the second parameter set 146 may include an indication of an ease of updating the software code 112 associated with the particular application 110. This may include an indication of whether the software code 112 associated with the particular application 110 may be updated using low code application development tools. This first parameter may indicate whether the ease of updating the software code 112 associated with the particular application 110 allows upgrading the software application 110 to one or more newer technologies 152. For example, when the determined ease of upgrading the software code 112 indicates that the software code 112 may not be upgraded using low-code application development tools (e.g., associated with a new technology 152), upgrade manager 140 may determine that the particular application 110 may not be upgraded to the new technology 152. For example, in some cases an owner of the computing infrastructure 102 may mandate certain secure coding practices which may add complexity to the software code 112, which in turn may not allow use of low-code application development tools. In this case, the software code 112 may not be upgradable using new technologies 152 that use low-code application development.

A second example parameter included in the second parameter set 146 may include an indication of an amount of technical debt associated with the software code 112 of the particular application 110. In one embodiment, the technical debt associated with the software code 112 may indicate a cost associated with upgrading the software code 112. The term "technical debt" typically refers to the implied cost incurred when organizations do not fix problems in the software code 112 that will affect them in the future. Accruing technical debt often causes existing problems to get worse over time. The longer the technical debt builds up, the more costly it becomes to rectify issues with the software code 112 that have built over time. For example, costs associated with subject matter experts (SMEs) may get higher with time. Thus, the longer the technical debt builds, the higher are the costs for rectifying the software code 112 using SMEs. A software code 112 with high technical debt is generally difficult and costlier to upgrade to a new technology 152. On the other hand, a mature software code 112 that has been constantly updated over time to avoid built up of technical debt is easier and cheaper to upgrade to a new technology 152. This second parameter may indicate whether the technical debt associated with the software code 112 of the particular application 110 allows upgrading the software application 110 to one or more newer technologies 152. For example, when the determined technical debt associated with the software code 112 is higher than a pre-set threshold, upgrade manager 140 may determine that the particular application 110 may not be upgraded to the new technology 152.

At operation 210, upgrade manager 140 identifies a new technology 152 associated with a corresponding legacy technology 124 in a legacy technology stack 120 associated with the software application 110.

As described above, upgrade manager 140 may be configured to determine one or more new technologies 152 based on which the particular software application 110 may be upgraded. As described above, upgrade manager 140 may be configured to store information associated with a plurality of new technologies 152, wherein one or more of the new technologies 152 may be associated with one or more new/modem technology stacks 150. In the context of the present disclosure a "new technology 152" refers to a modern technology that is newer than a corresponding legacy technology 124 of the legacy technology stack 120 being used by the computing infrastructure 102 to develop, run and maintain one or more software applications 110. In one embodiment, upgrade manager 140 may store information associated with one or more new technologies 152 corresponding to a legacy technology 124 that is currently being used in the computing infrastructure 102 to develop, run and maintain the particular software application 110. Information associated with a particular new technology 152 may include a plurality of attributes associated with the new technology 152 that may indicate a compatibility of the new technology 152 with a software application 110 and one or more legacy technologies 124 of the legacy technology stack 120. Upgrade manager 140 may be configured to identify one or more new technologies 152 that corresponds to a legacy technology 124 associated with the particular software application 110 and that may be used to upgrade the particular software application 110. For example, one or more attributes associated with a new technology 152 may indicate a type associated with the new technology 152. For example, when an attribute associated with a new technology 152 indicates that the new technology 152 is a modern operating system, upgrade manager 140 may match a legacy technology 124 that is a legacy operating system with the modern operating system.

At operation 212, upgrade manager 140 determines compatibility of the identified new technology 152 with the environment 130 associated with the software application 110 based on the first set of parameters (e.g., the first parameter set 144).

As described above, once a new technology 152 that may be potentially used to upgrade the particular software application 110 is identified, upgrade manager 140 may be configured to determine whether the new technology 152 can be used to upgrade the particular software application. This may include determining compatibility of the identified new technology 152 with the environment 130 associated with the particular software application 110 that is being evaluated for upgrade, and further determining compatibility of the identified new technology 152 with the particular software application 110.

Upgrade manager 140 may be configured to determine compatibility of the identified new technology 152 with the environment 130 associated with the particular software application based on the first parameter set 144. As described above, the first parameter set 144 represents the baseline associated with the environment 130 in which the particular software application 110 is being operated and includes parameters that are indicative of various characteristics of the environment 130.

In a first example, when a first parameter of the first parameter set 144 indicates a level/degree of complexity associated with the environment 130 associated with the particular software application 110, upgrade manager 140 determines whether the particular software application 110, when upgraded based on the new technology 152, supports and/or maintains the same level of complexity associated with the environment 130. In response to determining that the upgraded software application 110 supports and/or maintains the same level/degree of complexity associated with the environment 130, upgrade manager 140 may be configured to determine that the new technology 152 is compatible with the environment 130 with regard to the first parameter.

In a second example, when a second parameter of the first parameter set 144 indicates a level/degree of data consistency defined for data that is processed in the environment 130, upgrade manager 140 determines whether the particular software application 110, when upgraded based on the new technology 152, at least maintains the level/degree of data consistency defined for the data that is processed in the environment 130. In response to determining that the upgraded software application 110 at least maintains the level/degree of data consistency defined for the data that is processed in the environment 130, upgrade manager 140 may be configured to determine that the new technology 152 is compatible with the environment 130 with regard to the second parameter.

In a third example, when a third parameter of the first parameter set 144 indicates a level/degree of collaboration between the particular software application 110 and at least one of an upstream application 110 and a downstream application 110 in the environment 130, upgrade manager 140 may be configured to determine whether the particular software application 110, when upgraded based on the new technology 152, supports and/or maintains the level/degree of collaboration between the particular software application 110 and at least one of the upstream software application 110 and the downstream application 110 in the environment 130. In response to determining that the upgraded software application 110 supports and/or maintains the level/degree of collaboration between the particular software application 110 and at least one of the upstream software application 110 and the downstream application 110 in the environment 130, upgrade manager 140 may be configured to determine that the new technology 152 is compatible with the environment 130 with regard to the third parameter.

In a fourth example, when a fourth parameter of the first parameter set 144 indicates level/degree of flexibility associated with upgrading the software code 112 associated with the particular software application 110, upgrade manager 140 may be configured to determine whether the level of flexibility associated with upgrading the software code 112 based on the new technology 152 equals or exceeds a threshold. In response to determining that the level of flexibility equals or exceeds the threshold, upgrade manager 140 may be configured to determine that the new technology 152 is compatible with the environment 130 with regard to the fourth parameter.

At operation 214, upgrade manager 140 determines compatibility of the new technology 152 with the software application 110 based on the second set of parameters (e.g., second parameter set 146).

As described above, upgrade manager 140 may be configured to determine compatibility of the identified new technology 152 with the particular software application 110 based on the second parameter set 146. As described above, the second parameter set 146 represents a baseline associated with the particular software application 110 being investigated for a potential upgrade to the new technology 152 and includes parameters indicative of particular characteristics of the software code 112 associated with the particular software application 110.

In a first example, when a first parameter from the second parameter set 146 indicates an ease of updating the software code 112 associated with the particular application 110, upgrade manager 140 may be configured to determine whether the ease of updating the software code 112 associated with the particular application 110 allows upgrading the software application 110 to the new technology 152. For example, the first parameter may indicate whether the software code 112 may be upgraded using low-code application development tools (e.g., associated with the new technology 152). In response to determining that the software code 112 may be upgraded using low-code application development tools associated with the new technology 152, upgrade manager 140 may be configured to determine that the new technology 152 is compatible with the particular application 110 with regard to the first parameter of the second parameter set 146.

In a second example, when a second parameter from the second parameter set 146 indicates an amount of technical debt associated with the software code 112 associated with the particular application 110, upgrade manager 140 may be configured to determine whether the technical debt associated with the software code 112 equals or is below a threshold technical debt. In response to determining that the technical debt associated with the software code 112 equals or is below a threshold technical debt, upgrade manager 140 may be configured to determine that the new technology 152 is compatible with the particular application 110 with regard to the second parameter of the second parameter set 146.

At operation 216, if the new technology is not found to be compatible with the environment 130 and the particular software application 110, method 200 proceeds to operation 218, where alarms manager 140 determines that the particular software application 110 cannot be upgraded based on the identified new technology 152. On the other hand, if the new technology is found to be compatible with the environment 130 as well as the particular software application, method 200 proceeds to operation 220 where alarms manager 140 determines that the software application 110 can be upgraded based on the identified new technology 152, wherein upgrading the software application 110 comprises updating the software code 112 associated with the software application 110 based on the new technology 152.

As described above, upgrade manager 140 may be configured to determine whether the particular software application is upgradable to the identified new technology 152 based on whether the new technology 152 is compatible with one or more of the environment 130 associated with the particular software application 110, and with the particular software application 110 (e.g., software code 112 associated with the particular application 110). In one embodiment, upgrade manager 140 may be configured to determine that the particular software application 110 is upgradable to the identified new technology 152 in response to determining that the new technology 152 is compatible with the environment 130 associated with the particular software application 110 based on one or more parameter from the first parameter set 144. In an alternative or additional embodiment, upgrade manager 140 may be configured to determine that the particular software application 110 is upgradable to the identified new technology 152 in response to determining that the new technology 152 is compatible with the particular software application 110 (e.g., software code 112 associated with the particular application 110) based on one or more parameters from the second parameter set 146. In an additional or alternative embodiment, upgrade manager 140 may be configured to determine that the particular software application 110 is upgradable to the identified new technology 152 in response to determining that the new technology 152 is compatible with the environment 130 as well as the particular software application 110. Upgrading the particular software application 110 may include updating the software code 112 associated with the particular software application 110 based on the new technology. Updating the software code 112 may include editing the software code 112, re-writing portions of the software code 113 or re-writing the entire software code 112.

In one or more embodiments, in response to determining that the particular software application 110 is upgradable based on the new technology 152, upgrade manager 140 may be configured to generate a message including an indication that the particular application 110 new technology 152 can be upgraded based on the particular new technology 152. This message may be transmitted to one or more support teams responsible for upgrading systems within the computing infrastructure 102. One or more support team members may then upgrade the particular application 110 based on the new technology 152 by updating the software code 112 associated with the particular application 110. In an additional or alternative embodiment, in response to determining that the particular software application 110 is upgradable based on the new technology 152, upgrade manager 140 may be configured to automatically update the software code 112 to upgrade the particular application 110 based on the new technology 152.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising: a memory configured to store a first software application; and a processor communicatively coupled to the memory and configured to: perform a first scan of an environment associated with the software application, wherein the environment comprises a plurality of hardware and software components associated with the software application; determine a first set of parameters based on the first scan, wherein each determined parameter from the first set of parameters is indicative of a particular characteristic of the environment in which the software application is operating; perform a second scan of component layers of the software application, wherein the component layers comprise a model layer, a controller layer and a viewer layer; determine a second set of parameters based on the second scan, wherein each determined parameter from the second set of parameters is indicative of a characteristic of a software code associated with the software application; determine a new technology associated with a corresponding legacy technology in a legacy technology stack associated with the software application; determine compatibility of the new technology with the environment associated with the software application based on the first set of parameters; determine compatibility of the new technology with the software application based on the second set of parameters; in response to determining the new technology is compatible with the environment and the software application, determine that the software application can be upgraded based on the new technology; and update the software code associated with the software application based on the new technology.

2. The system of claim 1, wherein the first set of parameters associated with the environment comprises one or more of:
a first parameter indicating a level of complexity associated with the environment;
a second parameter indicating a level of data consistency defined for data that is processed in the environment;
a third parameter indicating a level of collaboration between the software application and at least one of an upstream software application and a downstream application; and
a fourth parameter indicating a level of flexibility associated with upgrading the software code associated with the software application.

3. The system of claim 2, wherein the processor is further configured to determine compatibility of the new technology with the environment associated with the software application based on the first parameter by:
determining whether the software application, when upgraded based on the new technology, maintains the level of complexity associated with the environment; and
in response to determining that the upgraded software application maintains the level of complexity associated with the environment, determining that the new technology is compatible with the environment with regard to the first parameter.

4. The system of claim 2, wherein the processor is further configured to determine compatibility of the new technology with the environment associated with the software application based on the second parameter by:
determining whether the software application, when upgraded based on the new technology, maintains the level of data consistency defined for the data that is processed in the environment; and
in response to determining that the upgraded software application maintains the level of data consistency defined for the data that is processed in the environment, determining that the new technology is compatible with the environment with regard to the second parameter.

5. The system of claim 2, wherein the processor is further configured to determine compatibility of the new technology with the environment associated with the software application based on the third parameter by:
determining whether the software application, when upgraded based on the new technology, maintains the level of collaboration between the software application and at least one of the upstream software application and the downstream application; and
in response to determining that the upgraded software application maintains the level of collaboration between the software application and at least one of the upstream software application and the downstream application, determining that the new technology is compatible with the environment with regard to the third parameter.

6. The system of claim 2, wherein the processor is further configured to determine compatibility of the new technology with the environment associated with the software application based on the fourth parameter by:
determining whether the level of flexibility associated with upgrading the software code associated with the software application equals or exceeds a threshold; and
in response to determining that the level of flexibility associated with upgrading the software code associated with the software application equals or exceeds a threshold, determining that the new technology is compatible with the environment with regard to the fourth parameter.

7. The system of claim 1, wherein the second set of parameters associated with the software application comprises one or more of:
a first parameter indicating an ease of updating the software code associated with the software application using low code application development tools; and
a second parameter indicating an amount of technical debt associated with the software code, wherein the technical debt indicates a cost associated with upgrading the software code.

8. The system of claim 7, wherein the processor is further configured to determine compatibility of the new technology with the software application based on the first parameter by:
determining whether the software code associated with the software application is upgradable using low-code application development tools; and
in response to determining that the software code associated with the software application is upgradable using low-code application development tools, determining that the new technology is compatible with the software application with regard to the first parameter.

9. The system of claim 7, wherein the processor is further to determine compatibility of the new technology with the software application based on the first parameter by:
  determining whether the technical debt associated with the software code equals or is below a threshold; and
  in response to determining that the technical debt associated with the software code equals or is below a threshold, determining that the new technology is compatible with the software application with regard to the second parameter.

10. A method for upgrading a software application comprising: performing a first scan of an environment associated with a software application, wherein the environment comprises a plurality of hardware and software components associated with the software application; determining a first set of parameters based on the first scan, wherein each determined parameter from the first set of parameters is indicative of a particular characteristic of the environment in which the software application is operating; performing a second scan of component layers of the software application, wherein the component layers comprise a model layer, a controller layer and a viewer layer; determining a second set of parameters based on the second scan, wherein each determined parameter from the second set of parameters is indicative of a characteristic of a software code associated with the software application; determining a new technology associated with a corresponding legacy technology in a legacy technology stack associated with the software application; determining compatibility of the new technology with the environment associated with the software application based on the first set of parameters; determining compatibility of the new technology with the software application based on the second set of parameters; in response to determining the new technology is compatible with the environment and the software application, determining that the software application can be upgraded based on the new technology; and updating the software code associated with the software application based on the new technology.

11. The method of claim 10, wherein the first set of parameters associated with the environment comprises one or more of:
  a first parameter indicating a level of complexity associated with the environment;
  a second parameter indicating a level of data consistency defined for data that is processed in the environment;
  a third parameter indicating a level of collaboration between the software application and at least one of an upstream software application and a downstream application; and
  a fourth parameter indicating a level of flexibility associated with upgrading the software code associated with the software application.

12. The method of claim 11, wherein determining compatibility of the new technology with the environment associated with the software application based on the first parameter comprises:
  determining whether the software application, when upgraded based on the new technology, maintains the level of complexity associated with the environment; and
  in response to determining that the upgraded software application maintains the level of complexity associated with the environment, determining that the new technology is compatible with the environment with regard to the first parameter.

13. The method of claim 10, wherein the second set of parameters associated with the software application comprises one or more of:
  a first parameter indicating an ease of updating the software code associated with the software application using low code application development tools; and
  a second parameter indicating an amount of technical debt associated with the software code, wherein the technical debt indicates a cost associated with upgrading the software code.

14. The method of claim 13, wherein determining compatibility of the new technology with the software application based on the first parameter comprises:
  determining whether the software code associated with the software application is upgradable using low-code application development tools; and
  in response to determining that the software code associated with the software application is upgradable using low-code application development tools, determining that the new technology is compatible with the software application with regard to the first parameter.

15. The method of claim 13, wherein determining compatibility of the new technology with the software application based on the first parameter comprises:
  determining whether the technical debt associated with the software code equals or is below a threshold; and
  in response to determining that the technical debt associated with the software code equals or is below a threshold, determining that the new technology is compatible with the software application with regard to the second parameter.

16. A non-transitory computer-readable medium storing instructions that when executed by a processor cause the processor to: perform a first scan of an environment associated with a software application, wherein the environment comprises a plurality of hardware and software components associated with the software application; determine a first set of parameters based on the first scan, wherein each determined parameter from the first set of parameters is indicative of a particular characteristic of the environment in which the software application is operating; perform a second scan of component layers of the software application, wherein the component layers comprise a model layer, a controller layer and a viewer layer; determine a second set of parameters based on the second scan, wherein each determined parameter from the second set of parameters is indicative of a characteristic of a software code associated with the software application; determine a new technology associated with a corresponding legacy technology in a legacy technology stack associated with the software application; determine compatibility of the new technology with the environment associated with the software application based on the first set of parameters; determine compatibility of the new technology with the software application based on the second set of parameters; in response to determining the new technology is compatible with the environment and the software application, determine that the software application can be upgraded based on the new technology; and update the software code associated with the software application based on the new technology.

17. The non-transitory computer-readable medium of claim 16, wherein the first set of parameters associated with the environment comprises one or more of:
  a first parameter indicating a level of complexity associated with the environment;
  a second parameter indicating a level of data consistency defined for data that is processed in the environment;

a third parameter indicating a level of collaboration between the software application and at least one of an upstream software application and a downstream application; and a fourth parameter indicating a level of flexibility associated with upgrading the software code associated with the software application.

18. The non-transitory computer-readable medium of claim 17, wherein determining compatibility of the new technology with the environment associated with the software application based on the first parameter comprises:

determining whether the software application, when upgraded based on the new technology, maintains the level of complexity associated with the environment; and in response to determining that the upgraded software application maintains the level of complexity associated with the environment, determining that the new technology is compatible with the environment with regard to the first parameter.

19. The non-transitory computer-readable medium of claim 16, wherein the second set of parameters associated with the software application comprises one or more of:

a first parameter indicating an ease of updating the software code associated with the software application using low code application development tools; and a second parameter indicating an amount of technical debt associated with the software code, wherein the technical debt indicates a cost associated with upgrading the software code.

20. The non-transitory computer-readable medium of claim 19, wherein determining compatibility of the new technology with the software application based on the first parameter comprises:

determining whether the software code associated with the software application is upgradable using low-code application development tools; and in response to determining that the software code associated with the software application is upgradable using low-code application development tools, determining that the new technology is compatible with the software application with regard to the first parameter.

* * * * *